United States Patent [19]

Walraven et al.

[11] 4,071,182
[45] Jan. 31, 1978

[54] METHOD OF MAKING CONTAINER WITH EASY OPEN TOP

[75] Inventors: Thomas A. Walraven, West Chester; John G. Thomas, Berwyn; James B. Hall, Chester Springs, all of Pa.

[73] Assignee: Christiana Metals Corporation, West Chester, Pa.

[21] Appl. No.: 771,050

[22] Filed: Feb. 22, 1977

Related U.S. Application Data

[62] Division of Ser. No. 720,533, Sept. 7, 1976, Pat. No. 4,036,397.

[51] Int. Cl.² .............................................. B23K 1/06
[52] U.S. Cl. ................................................... 228/110
[58] Field of Search ......................... 228/110, 111, 1; 220/268

[56] References Cited

U.S. PATENT DOCUMENTS

| | | | |
|---|---|---|---|
| 2,261,117 | 11/1941 | Jack | 220/268 |
| 3,184,841 | 5/1965 | Jones | 228/110 |
| 3,709,424 | 1/1973 | Drees | 228/1 X |
| 3,905,513 | 9/1975 | Klein | 220/268 |
| 3,926,357 | 12/1975 | Matrisian | 228/110 |
| 3,958,717 | 5/1976 | Ellis | 220/268 |
| 4,023,703 | 5/1977 | Strobe | 220/268 |

Primary Examiner—Donald G. Kelly
Attorney, Agent, or Firm—Seidel, Gonda & Goldhammer

[57] ABSTRACT

A container adapted to contain a beverage or other goods is provided with an easy open top by a disk juxtaposed to a hole in the container lid and welded to the container lid by a ring weld circumscribing the hole. Access to the contents of the container is attained by pushing the disk into the container whereby the disk tears along the weld and does not separate from the lid.

4 Claims, 9 Drawing Figures

METHOD OF MAKING CONTAINER WITH EASY OPEN TOP

This application is a division of copending application Ser. No. 720,533 filed on Sept. 7, 1976 and entitled Container with Easy Open Top, now U.S. Pat. No. 4,036,397, issued on July 19, 1977.

BACKGROUND

Most containers used for soft drinks, beer, food, juices and the like have an easy access to the contents by way of a pull-off or tear-off disk. When the disk is separated from the lid of the container, it constitutes a source of pollution. Occasionally, the ring or disk is dropped through the opening in the lid into the contents of the container. Thereafter, the contents of the container are consumed. When the ring or disk is separate from the container and is introduced into the container prior to consumption of the container's contents, there is a danger of the ring or disk being swallowed.

Thus, there is a need for an easy open top construction for containers whereby the disk is not separated from the lid when the contents of the container are available for access, while at the same time being capable of mass production at reasonable costs.

SUMMARY OF THE INVENTION

In accordance with the present invention, a sealed container is adapted to contain a product which generally will be liquid in form. The lid of the container has at least one hole therethrough. A disk is juxtaposed to the hole with the periphery of the disk being welded to the lid by an annular weld in the form of a closed loop which circumscribes the hole in the lid.

One portion of the annular weld is constructed to function as a hinge for the disk. Another portion of the weld is a stress director which initiates tearing of the disk adjacent the ID of the annular weld as finger pressure is applied to the disk and causes the disk to move into the container while remaining connected to the lid at said hinge.

It is an object of the present invention to provide a novel method of making an easy open top container capable of being opened by finger pressure but structurally interrelated so that the disk remains connected to the lid.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
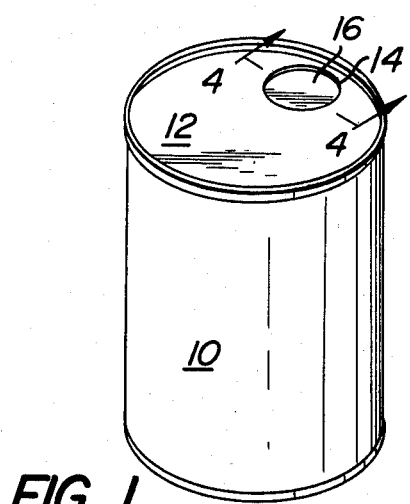
FIG. 1 is a perspective view of a container incorporating the easy open top construction of the present invention.

Referring to the drawings in detail, wherein like numerals indicate like elements, there is shown in FIG. 1 a container designated generally as 10. The container 10 may contain any one of a wide variety of products such as beer, soft drinks, juice, etc. The contents of the container 10 may be pressurized or carbonated, may be at atmospheric pressure, or may be at a pressure which is slightly below atmospheric pressure.

The container 10 is made of metal but may be any one of a wide variety of materials such as tin plated steel, aluminum, etc. The container 10 has a lid 12 which in turn is provided with an access hole 14. Access to the contents through hole 14 is prevented by the disk 16.

Figure 2:
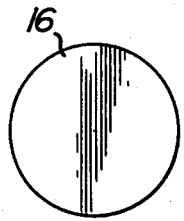
FIG. 2 is a plan view of a disk which is used to seal a hole in the container lid.

The disk 16 may have a variety of different peripheral contours. As shown in FIG. 2, it is provided with a contour which is circular and substantially greater in diameter than the hole 14. The disk 16 is juxtaposed to the hole 14 on the inner surface of the lid 12 and joined thereto by an annular weld 18 which circumscribes the hole 14. The weld 18 includes a portion 20 which acts as a hinge and a portion 22 which acts as a stress director.

The hinge 20 is a part of the weld 18 but has a shape or configuration which interrupts the tear path of the weld 18. The stress director 22 is preferably, but not necessarily, diametrically opposite the hinge 20 and likewise is a part of the weld 18. Stress director 22 may project radially toward or away from the edge of the hole 14 while terminating in a sharp point. Alternatively, the stress director 22 may intersect the hole 14 in the lid 12 to provide the stress concentration for tearing at said intersection. The purpose of the stress director 22 is to create high shear and/or stress concentrations in a localized area of the disk 16 so as to facilitate the case of rupturing the disk 16 at a predetermined point or location.

The disk 16 may be any one of a variety of different materials. It is preferred to make the disk 16 from aluminum foil. The thinner the foil, the easier it is to initiate tearing. Typical diameters for the disk 16 may be from ¼ inch to 1 inch. Satisfactory results have been attained by using 3003 H25 aluminum foil having a thickness of 0.003 inch and 3003 H19 aluminum foil having a thickness of 0.002 inch.

Figure 5:
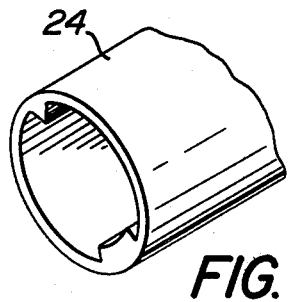
FIG. 5 is a partial perspective view of the free end of the torsional reed of an ultrasonic welder.

The annular weld 18, together with its integral hinge 20 and stress director 22, is preferably an ultrasonic weld attained by a single impulse using a torsional reed 24 having an end face as shown in FIG. 5 with ribs on its ID corresponding to elements 20, 22. Apparatus and methods for applying torsional welds are known to those silled in the art of welding. For example, see U.S. Pat. No. 3,184,841 which discloses apparatus and methods including a torsionally vibrating element, such as reed 24, adapted for contacting either the disk 16 or the lid 12 to apply a weld 18 having dimensions corresponding generally to the end face to reed 24. The weld 18 is attained by mechanical vibration having a frequency of between 59 and 300,000 cycles per second whereby peripheral portion of the reed 24 oscillates circumferentially about its longitudinal axis while engaging either the disk 16 or lid 12, with the direction of the mechanical vibration delivered by the peripheral portion of the reed 24 being substantially parallel to the interface of the disk 16 and lid 12 and with the vibratory energy being at a sufficient energy level to join disk 16 to lid 12 so as to provide a hermetic seal in the form of weld 18. In view of the disclosure in said U.S. Pat. No. 3,184,841, it is not deemed necessary to disclose the other parameters and/or apparatus involved in applying the ultrasonic weld 18.

Figure 3:
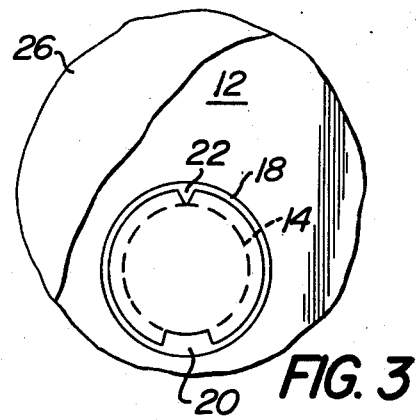
FIG. 3 is a plan view of the inner surface of the lid shown in FIG. 1.

As will be noted from the illustration in FIG. 3, the inner periphery of the hinge 20 is preferably adjacent to the edge of the hole 14. For purposes of complying with regulations relating to the canning of consumable food products, the entire inner surface of the lid 12 and the disk 22 may be provided with a coating 26. Coating 26 is preferably the conventional polymeric plastic coating which is sprayed onto the lid when the container 10 is used for soft drinks, beer, or other consumable food products which should not be permitted to be in direct contact with the metal from which the container and the lid are made. Where, due to the nature of the contents of the container 10, no such coating 26 is required, it may be eliminated.

Figure 4:
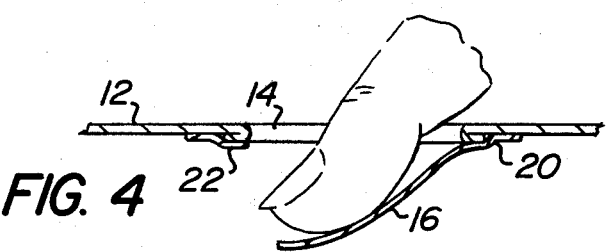
FIG. 4 is a diagrammatic illustration of the manner in which the disk is ruptured to permit access to the contents of the container.

In FIG. 4, there is diagramatically illustrated the lid 12 with a finger applying pressure to the exposed upper surface of the disk 16 thereby pushing the disk 16 inwardly and exposing the contents of the container 10. Finger pressure is applied initially adjacent the stress director 22 which initiates the tearing of the disk 16. Disk 16 will tear along the ID of the weld 18 and will bend and/or deform downwardly under finger pressure about the hinge 20 which does not tear. That is, the tearing action begins at the stress director 22 and progresses in both directions along the ID from the stress director to the hinge 20. Since the disk 16 remains inside the container 10, and attached to the lid 12 at the hinge 20, there is no danger of swallowing the disk 16 and there is no opportunity to pollute the environment with disks removed from the container lids. In the event that the disk 16 ruptures at the hinge 20 and separates from the lid 12, the diameter of the thusly separated disk is greater than the diameter of hole 14 which prevents or impedes its removal from within the container 10.

Figure 6:
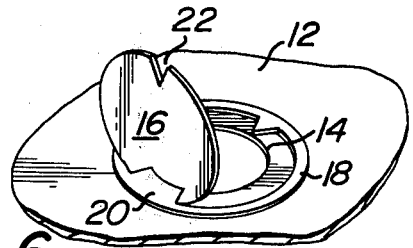
FIG. 6 is a perspective view of the inner surface of the lid and disk which has been ruptured as shown in FIG. 4.

In FIG. 6, there is illustrated the inner surface of the lid 12 with the ruptured disk 16 deflected by a finger as illustrated in FIG. 4. To prevent the edge of the hole 14 from scraping or cutting a person's finger, it is preferably rounded or folded back on its inner surface as shown in FIG. 4 or may be folded back on its outer surface. It will be noted that the deformed portion of the disk 16 has a notch corresponding generally to the shape of the stress director 22 which remains as a part of the weld zone on the inner surface of the lid 12.

Figure 7:
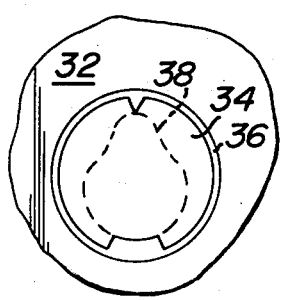
FIG. 7 is a top plan view of a lid in accordance with another embodiment of the present invention.

As shown in FIG. 3 the hole 14 is circular. In FIG. 7, there is illustrated the inner surface of a lid 32 in accordance with another embodiment of the present invention wherein the hole 38 is pear-shaped. The disk 34 is juxtaposed to the hole 38 and jointed thereto along the weld 36 which incorporates a hinge and stress director as described above. The weld 36 circumscribes the hole 38. A coating similar to coating 26 may be applied in the same manner.

Figure 8:
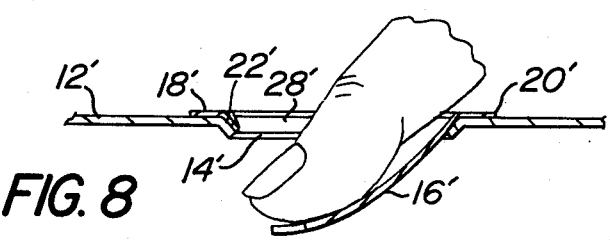
FIG. 8 is a diagrammatic illustration of the disk being ruptured to facilitate access to the container in accordance with the embodiment shown in FIG. 7.

In connection with each of the above embodiments, the disk was welded to the inner surface of the lid. As shown in FIG. 8, the disk 16' may be juxtaposed to a hole 14' in the lid 12' while being welded to the upper or exposed surface of the lid 12'. A slight bevel 28 may be provided in the lid 12' immediately adjacent the periphery of hole 14' with rounded edges at the hole 14'. The weld 18' is identical with weld 18 and includes a hinge 20' and an energy director 22' in the same manner as describe above. When the disk overlies the hole in the lid such as in FIG. 8, the transverse dimensions of the weld 18' and preferably closer to the transverse dimensions of the hole as compared to the embodiment of FIGS. 1–6 wherein the disk can be substantially larger than the hole.

In connection with FIG. 8, the portion of the disk 16' which ruptures along the ID of the weld 18' initially has transverse dimensions slightly greater than the transverse dimensions of the hole 14'. The application of finger pressure easily deforms the disk 16 so as to force it through the hole 14 while the disk remains secured to the lid 12' at the hinge 20'.

Each of the embodiments disclosed have the same attributes as those discussed above in connection with FIGS. 1–6. While each embodiment illustrates the lid as having one hole, it is within the scope of the present invention to provide two such holes each hermetically sealed by a disk as described above. When two such holes are utilized, they are preferably of different sizes with one hole being an air hole to facilitate entry of air into the container 10 when the contents thereof are poured out through the outer hole.

Figure 9:
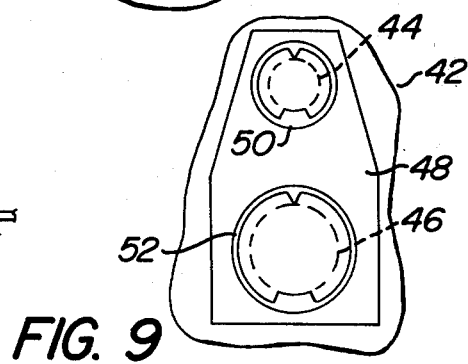
FIG. 9 is a plan view of a lid incorporating more than one hole.

An example of a lid having more than one hole is shown in FIG. 9 which illustrates a portion of the inner surface of a lid 42 having a small hole 44 and a larger hole 46. The disk 48 is juxtaposed to each of the holes 44, 46. An ultrasonic weld 50 circumscribes the hold 44 and joins the disk 48 to the inner surface of lid 42. A separate discrete ultrasonic weld 52 circumscribes the hole 46 and joins the disk 48 to the lid 42. Each of the welds 50, 52 are provided with a hinge and stress director as described above.

In each embodiment, it is preferred to have the stress director adjacent a central portion of the lid with the hinge being adjacent a peripheral portion of the lid. This orientation is a matter of practicality since there will be a better flow pattern with less resistance to flow out of the container 10 and less likelihood of the disk being moved to a partially closed position by the flowing contents of the container 10.

As pointed out above, the disk may be ultrasonically welded to the lid or the lid may be ultrasonically welded to the disk depending upon which is in contact with the torsionally vibrating reed. As will be apparent from FIGS. 3 and 7, for example, the shape of the weld need not conform to the shape of the hole in the lid so long as the weld circumscribes the hole. Where a hermetic seal is not required, the annular weld may be discontinuous. If desired, the annular bond may be formed partially with an ultrasonic weld and partially of some other mechanism such as adhesive.

The present invention may be embodied in other specific forms without departing from the spirit or essential attributes thereof and, accordingly, reference should be made to the appended claims, rather than to the foregoing specification as indicating the scope of the invention.

We claim:

1. In a method of sealing a product within a container by hermetically sealing the periphery of a lid to the container after the product has been introduced in the container, the improved method of providing an easy access to the product in the container comprising the steps of providing the lid with a hole, placing a disk larger than the hole so that the disk is juxtaposed to the hole, ultrasonically welding the disk to the lid to thereby provide an annular weld circumscribing the hole before the lid is sealed to the container, providing said weld with a hinge spaced from a stress director having an apex adjacent the periphery of the hole to facilitate initiation of tearing of the disk adjacent the ID of the weld as finger pressure is applied directly to the disk for causing the disk to move into the container with said disk remaining connected to the lid at said hinge.

2. A method in accordance with claim 1 including providing said hinge and stress director simultaneously with the weld as a part thereof.

3. A method in accordance with claim 1 including welding said disk to the inner surface of said lid.

4. A method in accordance with claim 1 including welding said disk to the outer surface of said lid.

* * * * *